United States Patent
Neuendorffer et al.

(10) Patent No.: US 7,969,187 B1
(45) Date of Patent: Jun. 28, 2011

(54) HARDWARE INTERFACE IN AN INTEGRATED CIRCUIT

(75) Inventors: Stephen A. Neuendorffer, San Jose, CA (US); Paul M. Hartke, Palo Alto, CA (US); Paul R. Schumacher, Berthoud, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 12/851,903

(22) Filed: Aug. 6, 2010

Related U.S. Application Data

(62) Division of application No. 11/405,895, filed on Apr. 18, 2006, now Pat. No. 7,834,658.

(51) Int. Cl.
*H03K 19/173* (2006.01)

(52) U.S. Cl. ............... 326/38; 326/41; 326/47; 712/34; 712/35; 712/220

(58) Field of Classification Search ............. 326/37–41; 712/34–35, 220, 200–203; 711/132, 203, 711/170, 6
See application file for complete search history.

(56) References Cited

U.S. PATENT DOCUMENTS

| | | | | |
|---|---|---|---|---|
| 6,408,382 | B1 * | 6/2002 | Pechanek et al. | 712/227 |
| 7,000,161 | B1 * | 2/2006 | Allen et al. | 714/725 |
| 7,669,037 | B1 | 2/2010 | Schumacher et al. | |
| 7,743,176 | B1 | 6/2010 | Turney et al. | |
| 2003/0009651 | A1 * | 1/2003 | Najam et al. | 712/34 |

OTHER PUBLICATIONS

U.S. Appl. No. 11/405,895, filed Apr. 18, 2006, Neuendorffer et al.

* cited by examiner

*Primary Examiner* — James H. Cho
*Assistant Examiner* — Christopher Lo
(74) *Attorney, Agent, or Firm* — W. Eric Webostad; Thomas George

(57) ABSTRACT

A hardware interface in an integrated circuit is disclosed. The hardware interface comprises data storage coupled to store and provide data; a data shifter coupled to the data storage to at least bit shift the data obtained from the data storage; and a control circuit coupled to the data storage and the data shifter for controlling a transfer of the data from the data storage and the data shifter. The control circuit comprises a state machine for controlling operation of the data storage and the data shifter; and the state machine is programmable responsive to code executable by a processor coupled to an auxiliary processing unit to adapt to the auxiliary processing unit.

17 Claims, 13 Drawing Sheets

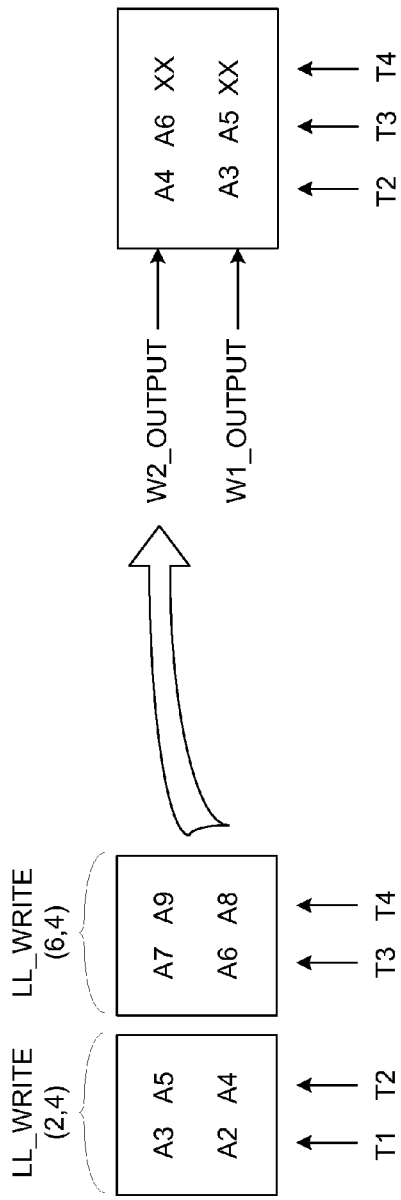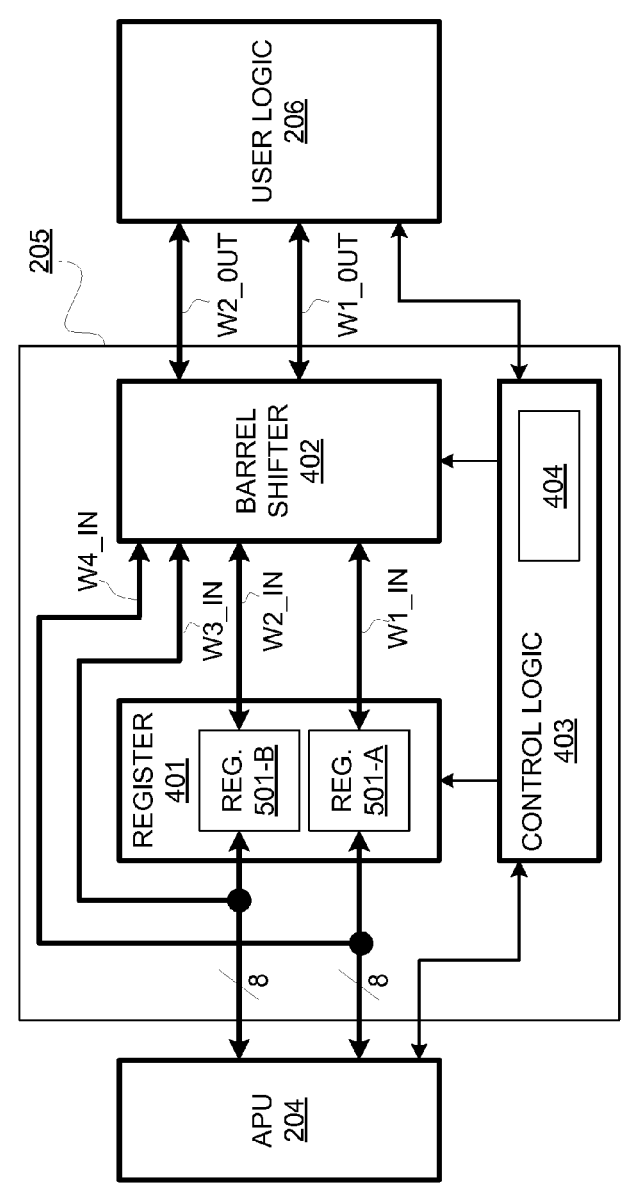
FIG. 5A
FIG. 5B

```
701 ⟶ VSError VSInitialize (VSDeviceNum Device)

VSError VSWrite (VSDeviceNum Device, unsigned int Opcode, unsigned long Count, VSWord *Buffer)
     {
         static unsigned char bitstream[16]    __attribute__   ((aligned(32))) = {0};
         unsigned char *bufferTemp;
         unsigned int byteoverhead;
         unsigned int TotalQuads;
         unsigned int TempOpcode;

703 ⟶  byteoverhead = (unsigned int)Buffer & 0x0000000F;

704 ⟶  TempOpcode   = Opcode & 0x7FF;
         *bitstream     = (0x0F & (TempOpcode >> 8))+0xF0;
         *(bitstream+1) = 0xFF & TempOpcode;

705 ⟶  *(bitstream+2) = 0x0F & (Count >> 8) + byteoverhead <<4;
         *(bitstream+3) = 0xFF & (Count);

706 ⟶  apu_loadquadword(bitstream, 0, 0);

707 ⟶  bufferTemp = (unsigned char *) (((unsigned int)Buffer) & 0xFFFFFFF0);

708 ⟶  TotalQuads = ((Count + byteoverhead) & 0x0F > 0) ? (Count+byteoverhead)>>4+1:
     (Count+byteoverhead)>>4
         for (i = 0; i < TotalQuads; i++) {
             apu_loadquadword(bufferTemp, 0, 0);
             bufferTemp += 16;
         }
     }

709 ⟶ VSError VSRead (VSDeviceNum Device, unsigned int Opcode, unsigned long Count, VSWord *Buffer) {
         static unsigned char bitstream[16]    __attribute__   ((aligned(32))) = {0};
         unsigned char *bufferTemp;
         unsigned int byteoverhead;
         unsigned int TotalQuads;
         unsigned int TempOpcode;

710 ⟶  byteoverhead = (unsigned int)Buffer & 0x0000000F;
```

FIG. 7-1

```
711 →  TempOpcode      = Opcode & 0x7FF;
       *bitstream      = (0x0F & (TempOpcode >> 8))+0xF0;
       *(bitstream+1)  = 0xFF & TempOpcode;

712 →  *(bitstream+2)  = 0x0F & (Count >> 8) + byteoverhead << 4;
       *(bitstream+3)  = 0xFF & (Count);

713 →  apu_loadword(bitstream, 0, 0);

714 →  bufferTemp = (unsigned char *) (((unsigned int)Buffer) & 0xFFFFFFF0);

715 →  TotalQuads = ((Count + byteoverhead) & 0x0F > 0) ? (Count+byteoverhead)>>4+1:
       (Count+byteoverhead)>>4
       for (i = 0; i < TotalQuads; i++) {
           apu_storequadword(bufferTemp, 0, 0);
           bufferTemp += 16;
       }
    }
```

```
801 → wr_fifo_pipeline(63 downto 0) <= APU2FCM_LOADDATA & wr_fifo_pipeline(63 downto 32);

802 → if wr_fifo_offset = "00" then
          wr_fifo_data_out <= wr_fifo_pipeline(63 downto 32);
      else
          wr_fifo_data_out <= wr_fifo_pipeline((conv_integer(wr_fifo_offset) + 4) * 8 - 1
      downto conv_integer(wr_fifo_offset) * 8);
      end if;

803 → if wasted_words(2) = '1' or wasted_words(3) = '1' then
          wasted_words <= wasted_words - 4;
          wr_fifo_rdy_pipeline <= '1';
      else
          if wasted_words = "0000" then
              wr_fifo_rdy_pipeline <= '0';
          else
              wasted_words <= "0000";
              wr_fifo_rdy_pipeline <= '1';
          end if;
      end if;
```

FIG. 8

HARDWARE INTERFACE IN AN INTEGRATED CIRCUIT

FIELD OF THE INVENTION

One or more aspects of the invention relate generally to integrated circuits and, more particularly, to a hardware interface in an integrated circuit.

BACKGROUND

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

A more recent addition to FPGA architecture is the inclusion of an Auxiliary Processor Unit ("APU"). The APU provides a high-bandwidth interface between programmable logic of an FPGA and an embedded processor of the FPGA. Although, an APU is generally intended for coupling a coprocessor to the embedded processor, it may be used for other applications.

In the APU provided in Virtex-4 FPGAs available from Xilinx, Inc. of San Jose, Calif., information may be read from or written to cache memory via an embedded processor and the APU of the FPGA. All types of information, such as addresses, data, instructions, control signals, and the like, are referred to hereinafter as data for purposes of clarity and not limitation. In an example, cache memory may be read a wordline at a time where each wordline is 128 bits long, namely a quadword at a time where each word is 32 bits long. However, there may be situations where data to be obtained from cache memory is not quadword-aligned.

A limitation of the APU interface is that high-bandwidth operation generally requires data to be quadword-aligned. Thus, the APU may indicate that a high-bandwidth operation is invalid if data is not quadword-aligned, or the APU may transfer the data from an incorrect location in memory. However, using embedded processor instructions to pre-align data consumes embedded processor cycles and complicates instruction programming.

SUMMARY

One or more aspects of the invention generally relate to integrated circuits and, more particularly, to generation of an interface for coupling to an auxiliary processor unit.

A hardware interface in an integrated circuit is disclosed. The hardware interface comprises data storage coupled to store and provide data; a data shifter coupled to the data storage to at least bit shift the data obtained from the data storage; and a control circuit coupled to the data storage and the data shifter for controlling a transfer of the data from the data storage and the data shifter; wherein the control circuit comprises a state machine for controlling operation of the data storage and the data shifter; and wherein the state machine is programmable responsive to code executable by a processor coupled to an auxiliary processing unit to adapt to the auxiliary processing unit.

According to an alternate embodiment, a hardware interface in an integrated circuit comprises a register having a plurality of register banks coupled to store data; a data shifter coupled to receive data from the register and from an auxiliary processing unit; and a control circuit coupled to the register and the data shifter for controlling the transfer of the data from the register and the data shifter, the control circuit having a state machine for controlling operation of the register and the data shifter; wherein the state machine is programmable by a processor coupled to the auxiliary processing unit to enable a transfer of data with the auxiliary processing unit.

An integrated circuit having a hardware interface is also disclosed. The integrated circuit comprises a processor; an auxiliary processing unit coupled to the processor; a hardware interface coupled to the auxiliary processing unit, the hardware interface comprising a register coupled to store data; a data shifter coupled to receive data from the register and from the auxiliary processing unit; and a control circuit coupled to the register and the data shifter for controlling the transfer of the data from the register and the data shifter, the control circuit having a state machine for controlling operation of the register and the data shifter; wherein the state machine is programmable by a processor coupled to the auxiliary processing unit to enable a transfer of data with the auxiliary processing unit.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 5A is a flow diagram depicting input states and output states of an interface as depicted in FIG. 5B.

FIG. 5B is a block diagram depicting an exemplary embodiment of the interface of FIG. 4 for the example of the input states and output states described in the flow depicted in FIG. 5A.

FIG. 7, namely FIGS. 7-1 and 7-2 collectively, is a pseudo-code listing depicting an exemplary embodiment of an Application Program Interface ("API").

FIG. 8 is a pseudo-code listing depicting another exemplary embodiment of an API, which may be an interface for a delay line and a barrel shifter.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
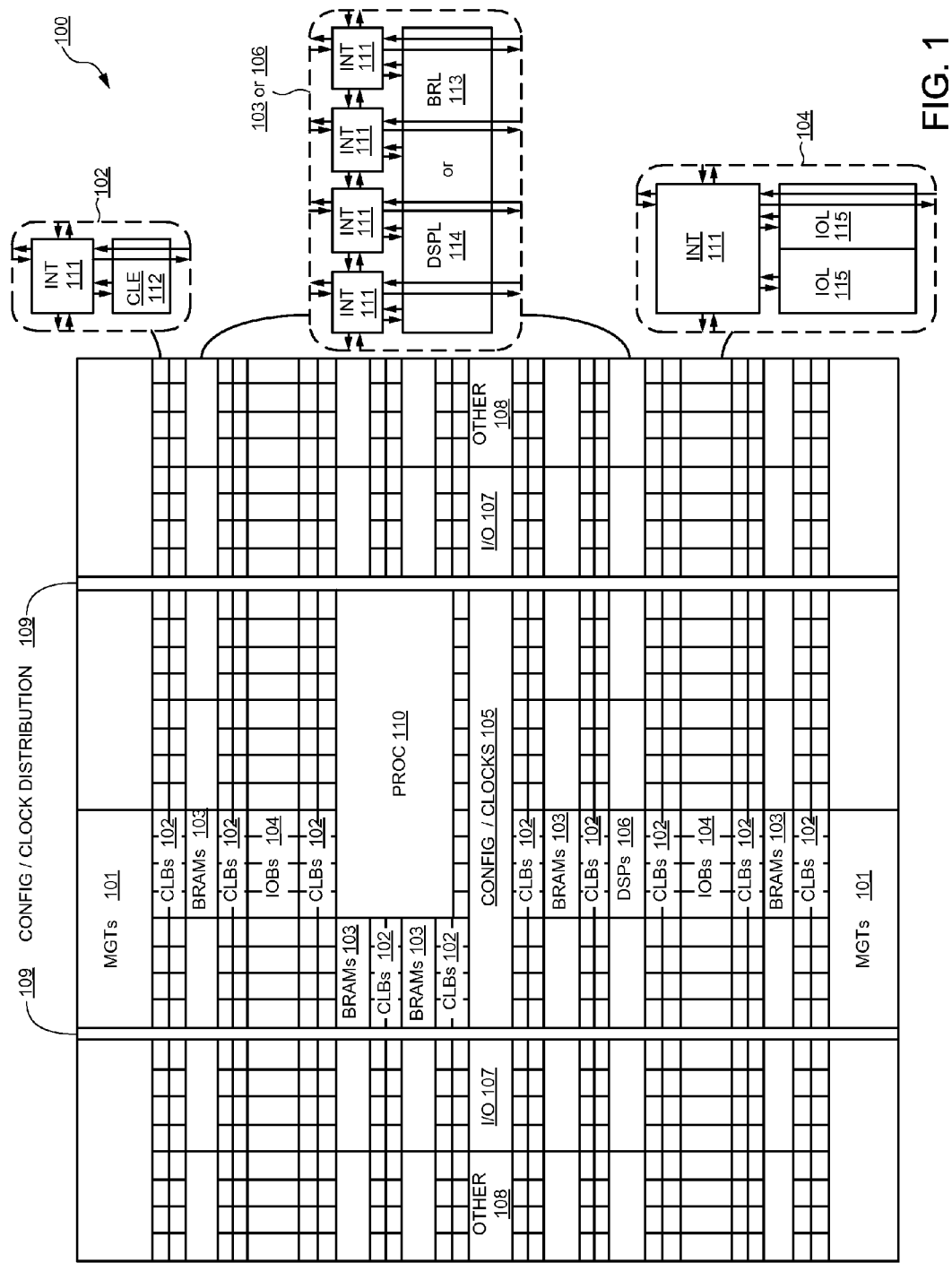
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4 FPGA from Xilinx of San Jose, Calif.

Figure 2:
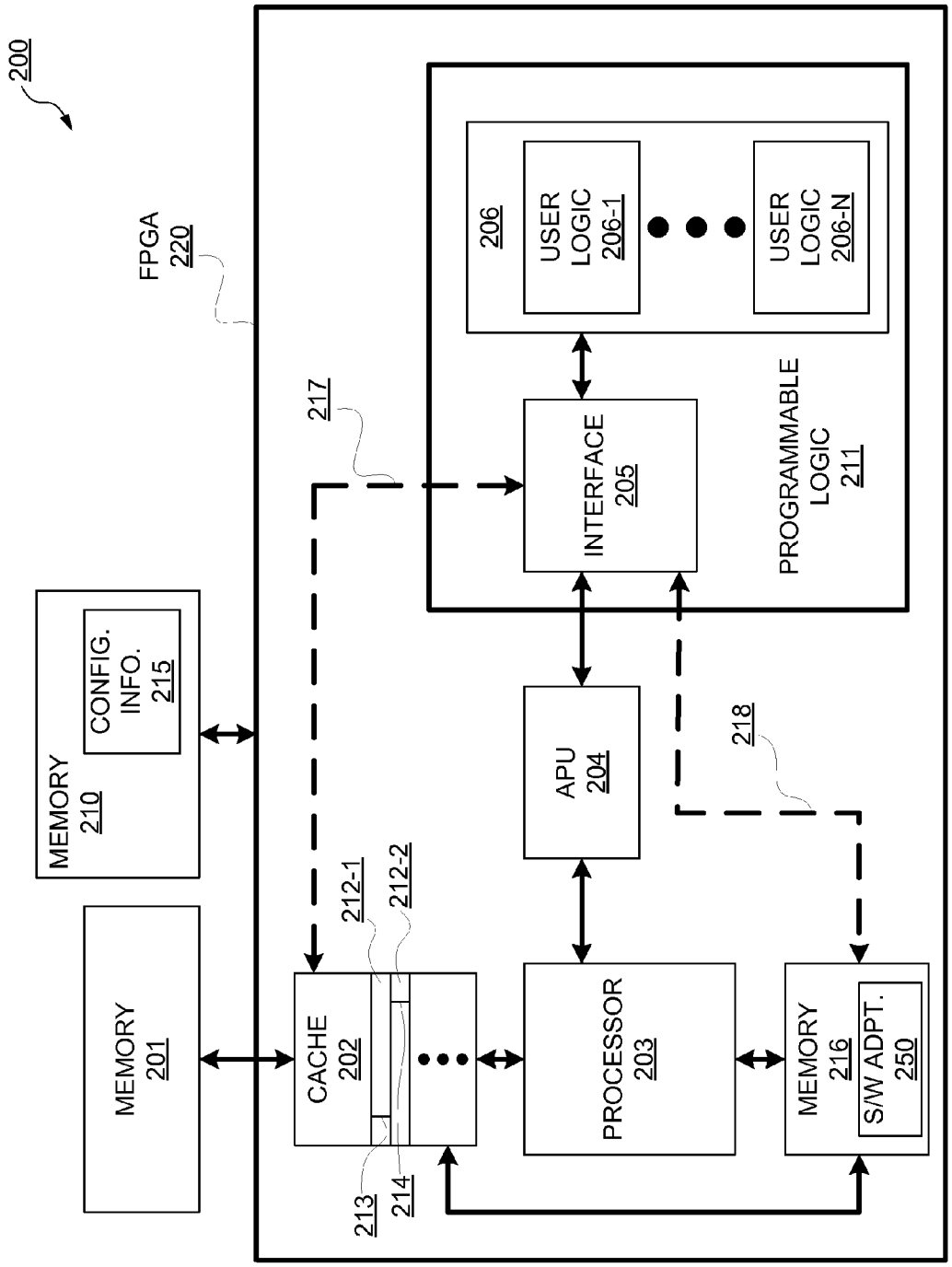
FIG. 2 is a block diagram depicting an exemplary embodiment of an FPGA coupled to external memories, generally indicated as a system.

FIG. 2 is a block diagram depicting an exemplary embodiment of an FPGA 220 coupled to memories 201 and 210, generally indicated as system 200. Memory 201 may be an external memory accessible by processor 203, such as via cache memory ("cache") 202. Memory 210 may be any means for storing configuration information 215 for configuring programmable logic 211 of FPGA 220 as user logic 206. Notably, FPGA 220 may use particular ports for receiving configuration information 215, as is known. Moreover, configuration information 215 may be provided to FPGA 220 via an Internet connection or other network connection, dedicated integrated circuit memory, disk memory, non-dedicated integrated circuit memory, such as a removable, non-volatile integrated circuit memory, or other known types of memory capable of storing configuration information 215.

Cache 202 may include a plurality of memory lines, such as wordlines 212-1 and 212-2. Although only two memory lines are illustratively shown, it is well known that cache 202 conventionally includes many more than two memory lines. For a burst operation, whether reading information from cache 202 or writing information to cache 202, use of Auxiliary Processor Unit ("APU") 204 involves word alignment for each line of memory being read or written to.

For example, if a starting point 213 of line 212-1 was offset from the beginning of line 212-1 by a number of one or more bytes, bursting using line 212-1 in its present condition would be an invalid operation. Moreover, if an end location 214 of data of line 212-2 was offset from the end of line 212-2 by a number of one or more bytes, then bursting would be an invalid operation for a read or write having an initial address associated with line 212-1. For purposes of clarity by way of example and not limitation, it shall be assumed that cache lines are 128 bits long, where each 32 bits represent a word, and that cache lines 212-1 and 212-2 are quadword lines. Furthermore, for purposes of clarity by way of example and not limitation, it shall be assumed that processor 203 has a bus length for reading or writing information from and to cache 202 that is 128 bits long and that the interface between APU 204 and processor 203 is 32 bits long. It should be appreciated that FPGA architectures other than the particular example described herein may be used, such as with different bit lengths for cache lines, interfaces between cache and processor, or between processor and APU, including any combination thereof, may be used other than those numerical values specifically described herein.

FPGA 220 includes cache 202 coupled to processor 203 and processor 203 coupled to APU 204. FPGA 220 includes programmable logic 211 where interface 205 and user logic 206 may be instantiated. User logic 206 may be instantiated responsive to configuration information 215. As shall be described in more detail below, interface 205 is generated using a software adapter 250 which may include an application program interface ("API"). Memory 216 may be coupled to processor 203 and may store software adapter 250. Code of software adapter 250 may be executed by processor 203.

Interface 205 facilitates reads and writes of cache 202 via processor 203 and APU 204 for user logic 206. Interface 205 facilitates a programmer or circuit designer of not having to address data alignment issues, such as for quadword-aligned data, for accessing cache 202. Generation of interface 205 responsive to execution of software adapter 250 may be facilitated by use of an API, described in additional detail below.

It should be appreciated that interface 205 may be for communication with one or more user logic instances 206-1 through 206-N, for N a positive integer greater than one. Thus, user logic 206 may use a single interface 205 for multiple circuit blocks. For purposes of clarity by way of example and not limitation, it shall be assumed that a single interface 205 and a single instance of user logic 206 are used, although it will be apparent to those of ordinary skill that buffering and multiplexing may be used to support multiple instances of user logic and a single interface, or that multiple interfaces may be used to support multiple instances of user logic, or any combination thereof.

Figure 3:
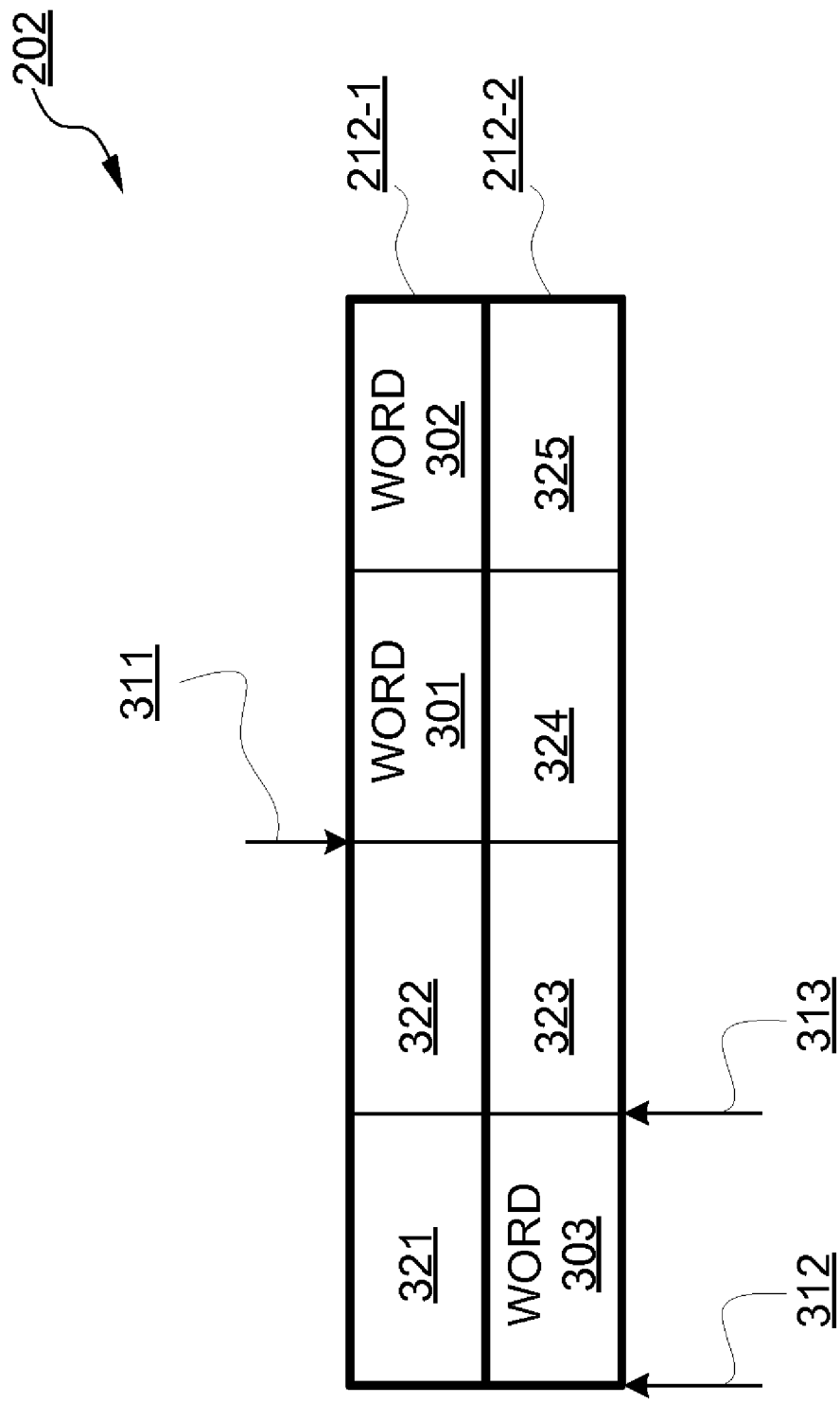
FIG. 3 is a block diagram depicting an exemplary embodiment of a portion of cache memory of the FPGA of FIG. 2.

FIG. 3 is a block diagram depicting an exemplary embodiment of a portion of cache 202. In this example, words 301 and 302 of cache line 212-1 are written in the third and fourth word positions of that line. The first and second word positions of cache line 212-1, as generally indicated by reference numbers 321 and 322 respectively, do not have any data written to them. Thus, a quadword-aligned APU load as generally indicated by arrow 311 ("load 311") may begin at the beginning of word 301 for cache line 212-1. Furthermore, word 303 is indicated in the first word position of cache line 212-2, and the second, third, and fourth word positions of cache line 212-2, generally indicated by reference numbers 323, 324, and 325 respectively, are not part of the load length of three words for this example. Accordingly, a quadword-aligned APU load for execution of load 311 may continue at the beginning of cache line 212-2 for word 303 as generally indicated by arrow 312, and end at the end of word 303 for a length of three words as generally indicated by arrow 313.

As described in additional detail below, it should be appreciated that to read words 301 through 303, multiple load instructions would be issued. However, having this complexity be transparent to a user, such that a user may simply issue a load command and have the correct load instructions provided, is facilitated by use of software adapter 250 of FIG. 2, as described in additional detail below. Notably, though load instructions are described, it should be appreciated that issuance of a command may cause one or more store instructions to be provided.

With renewed reference to FIG. 2, it should be appreciated that interface 205 facilitates load (e.g., a read from memory) and store (e.g., a write to memory) transparency for purposes of data alignment of data in cache 202 with respect to issues of offset and multiple load or store instructions. Although interface 205 is described herein in terms of being instantiated in programmable logic 211, it should be appreciated that interface 205 may be implemented in whole or in part as hardwired logic. For a hardwired implementation of interface 205, prior notice of the user design used to implement user logic 206 may be provided to the manufacturer of FPGA 220, and a design for interface 205 may be generated, where such design for interface 205 may be manufactured as hardwired logic. Furthermore, although the example of accessing cache 202 via processor 203 is shown, it should be appreciated that for programmable logic 211 having direct access 217 to cache 202, or direct access 218 to processor main memory 216, such direct access may be facilitated by use of interface 205. Thus, for example, an enhanced direct memory address ("DMA") transfer may be facilitated by instantiation of interface 205 when combined with the software infrastructure of software adapter 250. For interface 205 capable of being coupled directly to cache 202 as generally indicated by dashed line 217, or for interface 205 capable of being coupled directly to memory 216, as generally indicated by dashed line 218, data alignment for user logic 206 may be done by interface 205 without use of APU 204 or processor 203. However, such more direct forms of addressing may still involve alignment, such as quadword alignment, to facilitate transfers.

Figure 4:
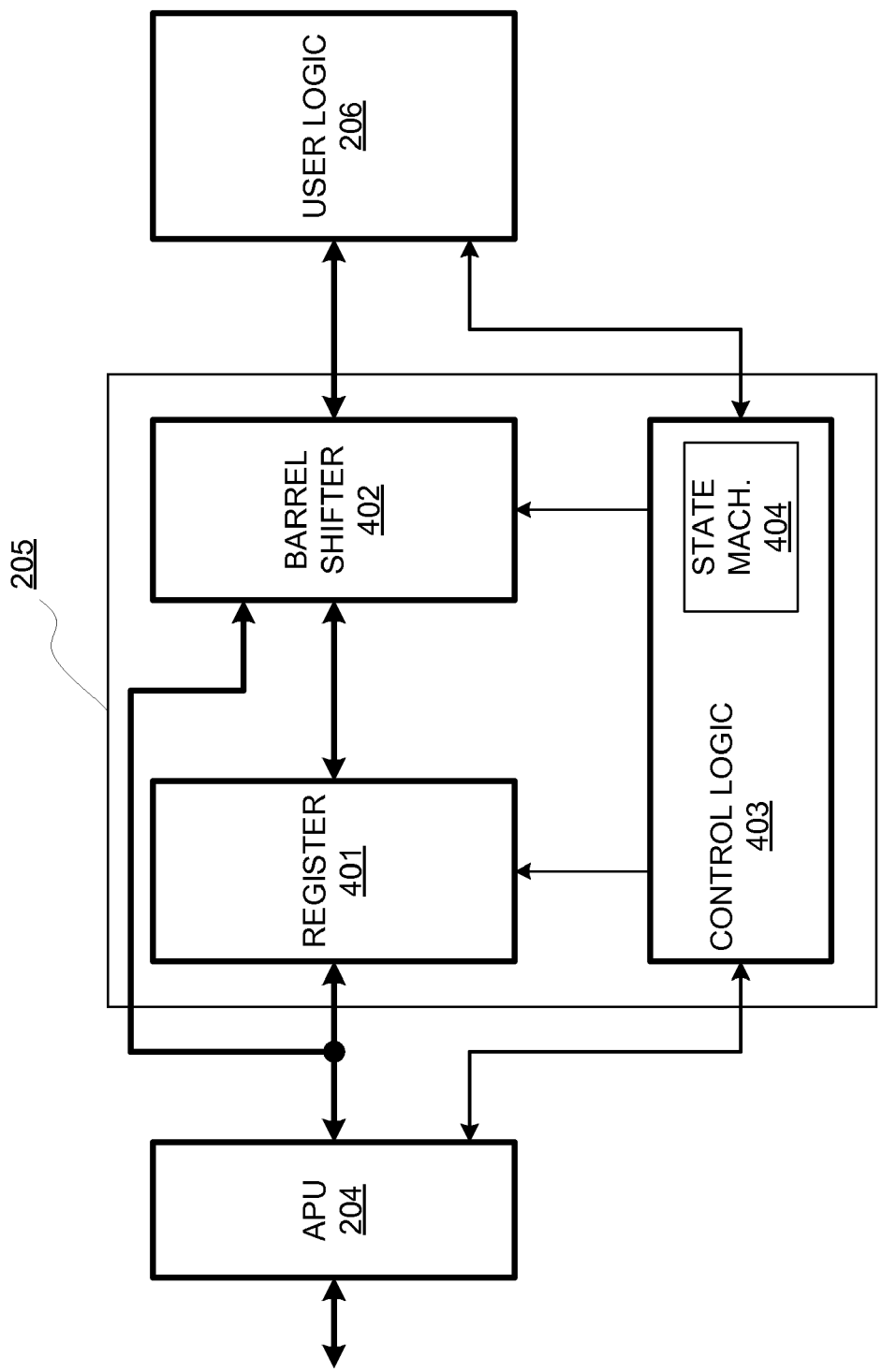
FIG. 4 is a block diagram depicting an exemplary embodiment of an interface coupled between user logic and an Auxiliary Processor Unit ("APU") of the FPGA of FIG. 2.

FIG. 4 is a block diagram depicting an exemplary embodiment of interface 205 coupled between user logic 206 and APU 204. Interface 205 includes register 401, barrel shifter 402, and control logic 403. Notably, though a barrel shifter 402 is used, it should be appreciated that more generally any bit, byte or other data shifter may be used in accordance with the description herein. Furthermore, a barrel shifter in its more classic sense may not be implemented, but rather a more streamlined version of a barrel shifter may be used as shall become more apparent from the following description.

With reference to FIGS. 3 and 4 in combination, operation of interface 205 for a write from cache 202 of FIG. 2 is described. Continuing the example of FIG. 3, an instruction associated with a software portion of user logic 206 is for a write starting at an address associated with cache line 212-1 for a length of three words. User software may be stored in memory 216. Software adapter 250 receives a command from user software and breaks the command down into two separate-line instructions, namely a load instruction starting a read at the beginning of cache line 212-1 and a load instruction starting a read at the beginning of cache line 212-2. Notably, the instruction is for the beginning of cache line 212-1 even though the first word of targeted data in the example of FIG. 3 may not be at the beginning of cache line 212-1. Accordingly, software adapter 250 may be used to program a state machine 404 of control logic 403 to cause barrel shifter 402 to shift one or more words for quadword data alignment.

A first load instruction may be initiated beginning at 311 for obtaining words 301 and 302 and a second load instruction may be initiated beginning at 312 for obtaining word 303. A high level command, such as a high-level load command, may thus be broken up into two lower level load instructions in this example. Each lower level load is started from the beginning of an associated cache line as specified by an address. These are valid loads as they are quadword-aligned. As indicated in FIG. 3, data does not start at the beginning of cache line 212-1. Thus, the barrel shifter 402 may shift twice.

Continuing the example of a load transfer from memory to an APU 204, after the first load instruction, transferred words 301 and 302 may be stored in register 401. Notably, in this example, register 401 may be a four-word-wide register. Word 303 may be provided from APU 204 to barrel shifter 402. Because barrel shifter 402 may be configured to provide all three words 301, 302, and 303 in parallel to user logic 206, which is expecting three words, data obtained in the second write need not be stored in register 401. Alternatively, word 303 may be stored in register 401 and all three registered words may be provided to barrel shifter 402 at one time from register 401. However, in either implementation, all three words are available to barrel shifter 402 for output at one time. Notably, control signaling between control logic 403 and APU 204 and between user logic 206 and control logic 403 may be used for controlling operation of register 401 and barrel shifter 402. Notably, this is only an example of one possible implementation, and other implementations may be used, including a word-wide shifter, and multiple bytes being registered and shifted.

Although a transfer of data from cache memory to user logic instantiated in programmable logic has been described, it should be understood that a reverse implementation of interface 205 may be used for receiving data from user logic 206 instantiated in programmable logic and placing such data at locations, which may be non-quadword-aligned, in cache memory. Interface 205 may be useful for assembling a stream of bytes for transmission on an output channel of a communications system. Notably, the presence of unaligned data may be detected dynamically as described above. However, with software analysis, unaligned data may be detected at compile time, in which implementation a less complex instantiation of control logic 403 may suffice. However, as the simpler implementation will follow from a more complex implementation, it shall be assumed that the detection of alignment of loads is dynamic. It should be appreciated that barrel shifter 402 may be configured to hide latency of the shift operation from software and hardware.

Generally, a protocol, such as a FIFO protocol for example, for user logic 206 may include first and last word flags and a word width. Word width, although it may be an arbitrary value, has an impact on the implementation of interface 205. In particular, the word width of APU 204 may be different from the length of a load instruction, and the word width of user logic 206 may be different from the word width of APU 204. Parameters that may be considered include: length of a high-level transfer (read or write); alignment of a high-level transfer; length of a low-level transfer; alignment of a low-level transfer; width of an APU transfer interface; and width of a co-processor interface.

Notably, the length of a high-level transfer command may be an arbitrary number of bytes as determined by a user, and the alignment of the high-level transfer command may also an arbitrary number of bytes as determined by the user. However, it should be appreciated that high-level transfer length and alignment may be selected such that interface 205 is more efficient.

Accordingly, it should be appreciated that quadword alignment is an issue with respect to hardware side, namely a low-level side, of an implementation, but may not be an issue with respect to a software side, namely a high-level side, of the implementation. In order to more clearly understand the generation of interface 205, examples of implementations are provided. For the following examples, it shall be assumed that the length of a high-level transfer command ("software load") is variable V1; the alignment of a software load is variable V2; the width of the APU transfer interface is variable V3; and the width of the user logic interface is variable V4.

For a first example, variables V1, V2, and V3, are all 4 bytes, and variable V4 is 1 byte. Register 401 may be implemented as 4 register banks with respective outputs to barrel shifter 402. Barrel shifter 402 may be implemented as a multiplexer to receive respective outputs from the register banks of register 401. Thus, control logic 403 may be used to clock out data stored in respective registers of register 401 to barrel shifter 402; barrel shifter 402 in turn selects which output to provide to user logic 206 one byte at a time. Notably, barrel shifter 402 may be held up from passing data to user logic 206 until all bytes have been loaded into all registers of register 401 for a transfer and then all of such data is passed to barrel shifter 402 for providing the data along to user logic 206. Accordingly, a protocol, such as a packet-based FIFO protocol, may include providing a data valid signal and a busy-do not send ("busy") signal. This signaling may be bidirectional as between APU 204 and control logic 403 and as between user logic 206 and control logic 403.

For a second example with V1 equal to 4 bytes, V2 equal to 1 byte, V3 equal to 2 bytes, and V4 equal to 1 byte, two register banks may be implemented for register 401, where each register bank stores 1 byte. In this example, because the APU interface is smaller than in the prior example, APU 204 will have to cycle twice for each transfer. Again, although transfers are illustratively shown as being from APU 204 to user logic 206, the reverse direction is equally applicable. In this example, therefore, register banks of register 401 may be loaded and selectively unloaded to barrel shifter 402 for input user logic 206 from barrel shifter 402 one byte at a time on a first transfer cycle, and on a second transfer cycle, APU 204 may reload register banks of register 401 for providing to barrel shifter 402 for selectively providing one byte at a time to user logic 206 from barrel shifter 402. Again, in this example, barrel shifter 402 may be implemented as a multiplexer. Notably, in this example, control logic 403 may be configured to count so as to know when a transfer has finished, and thus when busy signaling provided from control logic 403 to APU 204 may be asserted. Control signaling, such as between APU 204 and control logic 403 or between control logic 403 and user logic 206, may indicate whether data is valid, whether new data may be sent, or whether a transfer has not been completed. In the prior two examples, data has been aligned; however, in this next example, data is not aligned, and thus the high-level transfer, which in this example may be an APU load command, is broken down into two low-level instructions, such as low-level load instructions.

In a third example, V1 is set equal to 4 bytes, and V2, V3, and V4 are each set equal to 2 bytes. If a high-level transfer command with address 3 and length 4 ("(3,4)") is provided, then this address is broken up across low-level load instructions for an address divisible by two. Low-level loads may correspond to reads from respective lines in cache 202 of FIGS. 2 and 3. Thus, for this example, one low-level load instruction may have an address of 2 and a length of 4 for a read from memory, and the other low-level load instruction may have an address of 6 and a length of 4 for a read from memory. Notably, having a starting address of 2 ensures that the address in the high-level load command of 3 for a read from memory is captured. The second low-level load address therefore is merely the first low-level load address plus an increment to span the length, namely 2 plus 4.

FIG. 5A is a flow diagram depicting input states and output states of interface 205 of FIG. 5B. FIG. 5B is a block diagram depicting an exemplary embodiment of interface 205 for the above example, where APU 204 transfers a byte at a time to each register bank of registers 401.

With simultaneous reference to FIGS. 5A and 5B, operation of interface 205 of FIG. 5B is described. APU 204 transfers data associated with addresses A2 and A3 responsive to a low-level load instruction ("LL_WRITE") of address (2,4) to register banks 501-A and 501-B at time T1. Notably, data associated with addresses A2 and A3 is also provided to barrel shifter 402 at time T1 owing to register bypass paths associated with write 3 input ("W3_IN") and write 4 input ("W4_IN"). At time T2, the low-level load of address (2,4) continues where data associated with address A4 is loaded into register bank 501-A and data associated with address A5 is loaded into register bank 501-B. Furthermore, data associated with addresses A4 and A5 is respectively available to barrel shifter 402 on write 3 input and write 4 input. Additionally, data associated with addresses A2 and A3 has been output from register banks 501-A and 501-B to barrel shifter 402 respectively on write 1 input ("W1_IN") and write 2 input ("W2_IN"). Thus, barrel shifter 402 at time T2 has data bytes for the above example associated with addresses A2 through A5 available. However, as the high-level load command starts at address A3, the data at address A2 is not to be output to user logic 206. Accordingly, under control of control logic 403, barrel shifter 402, which may be considered a programmable switch, is programmed by control logic 403 to pass input on write 2 input to output on write 1 output for user logic 206. Furthermore, barrel shifter 402 under control of control logic 403 passes data on write 3 input to write 2 output for user logic 206. Notably, time T2 is indicated as having data associated with addresses A3 and A4 for write 1 output and write 2 output, respectively; however, it should be appreciated that time T2 on the output write side may be different than time T2 on the input side as far as the actual time that the events listed for T2 happen, although they are assumed to be the same time here for purposes of clarity by way of this example and not limitation.

At time T3, the low-level load instruction of address (6,4) is initiated, where data associated with addresses A6 and A7 are respectively loaded into register banks 501-A and 501-B, as well as respectively passed to barrel shifter 402 via write 3 input and write 4 input. Furthermore, at time T3, the data associated with address A4 and A5 previously loaded in register banks 501-A and 501-B is unloaded from those banks and respectively provided to barrel shifter 402 via write 1 input and write 2 input. At time T3, barrel shifter 402 passes the data associated with write 2 input to write 1 output, namely the data associated with address A5. Furthermore, at time T3, barrel shifter 402 passes the data associated with address A6 on write 3 input to write 2 output for user logic 206.

At time T4, data associated with addresses A8 and A9 is respectively provided to register banks 501-A and 501-B. Notably, data associated with addresses A7 and thereafter is "don't care" ("XX") data for this example operation, and thus is not described further. Notably, data associated with addresses A2 and A7 through A9, if any data is present including don't care data, may be dropped somewhere between APU 204 and user logic 206, as control logic 403 may indicate that such data is not valid for the high-level command of the example.

Differences between interfaces for APU 204 and user logic 206 may be generally transparent to a user, as instantiation of interface 205 responsive to execution of software as adapted to such differences with use of an API may be done. Furthermore, this adaptation may be done in accordance with the relative phase at which data is being sent rather than the phase at which the data is being received.

Figure 6:
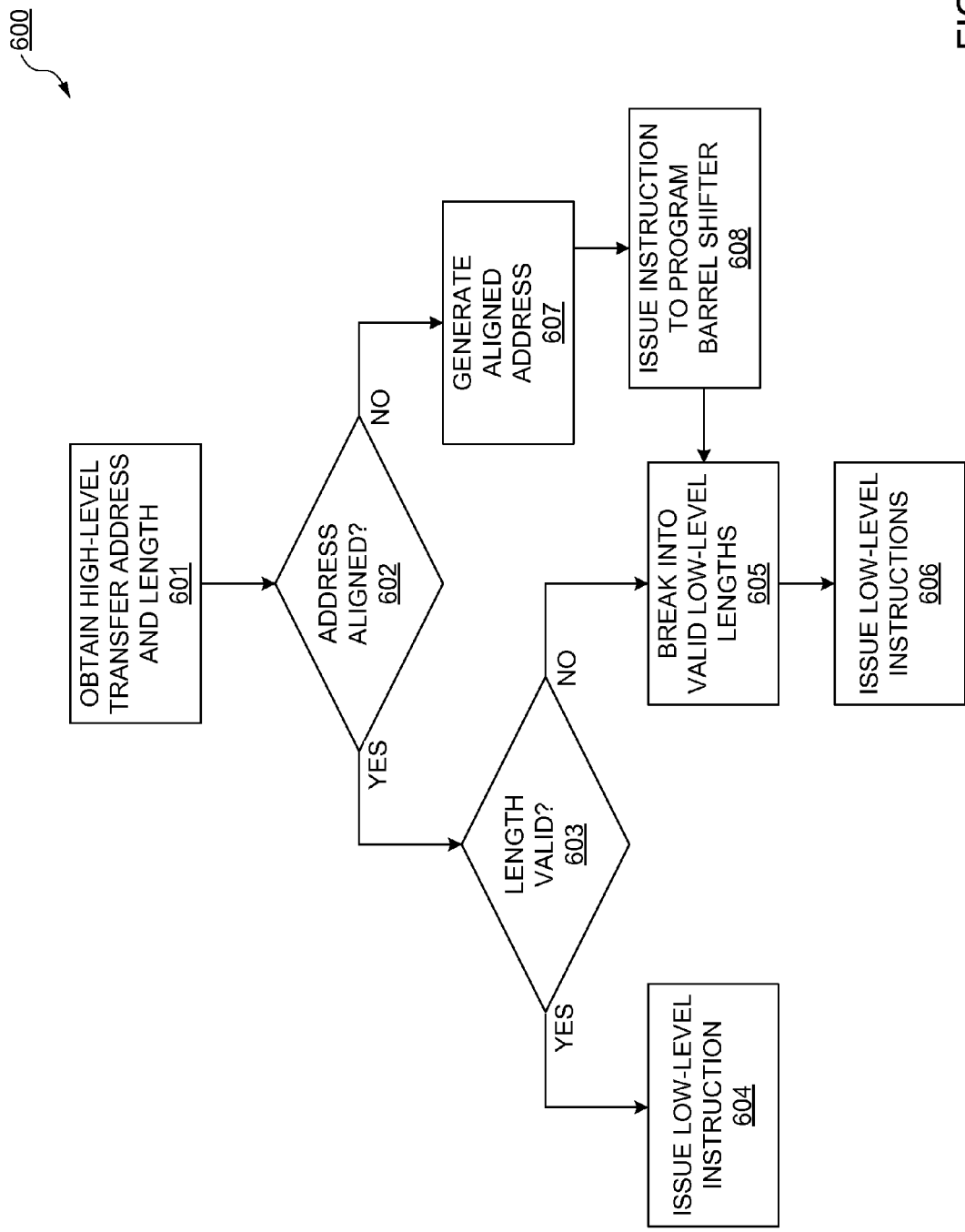
FIG. 6 is a flow diagram depicting an exemplary embodiment of an address verification flow for data alignment.

FIG. 6 is a flow diagram depicting an exemplary embodiment of an address verification flow 600 for data alignment. Address verification flow 600 begins at 601 by obtaining a high-level transfer command address and length of the data to be obtained at such address. At 602, it is determined whether the address obtained at 601 is an appropriately aligned address.

Assuming the address obtained is an appropriately aligned address, then at 603 it is determined whether the length obtained at 601 is valid. For example, the length obtained may not be longer than the bit length of a hardware register used for obtaining data. In the context of the above-described exemplary implementation of an APU of FIG. 4, the length may be a quadword, a word, or a byte. Notably, the high-level transfer command may be for a load or a store, such may respectively involve a read from memory or a write to memory, or a combination thereof. Thus, continuing the above example of cache memory with a quadword line length, the length may be a quadword, word, or byte, where the address is a quadword-aligned address, a word-aligned address, or a byte-aligned address, respectively. Accordingly, if the length is valid as determined at 603, a low-level transfer instruction may be issued at 604 for the high-level transfer command obtained at 601. If, however, the length is not valid as determined at 603, for example the length is longer than a quadword, then at 605, the high-level transfer command obtained at 601 is broken into multiple low-level instructions. After breaking the high-level length into valid lower-level lengths at 605, lower-level instructions with the lower-level lengths are issued at 606 using the address obtained at 601. Notably, the breaking up into multiple low-level instructions may involve performing a best-fit analysis at 605 with respect to the length obtained at 601 and the transfer length increment.

If the address is not an aligned address as determined at 602, then at 607, an aligned address is generated from the address obtained at 601. After generating an aligned address at 607, an instruction is issued to program a barrel shifter at 608. For example, this instruction may inform control logic that a transfer is to take place and that particular bytes are to be identified for the transfer. After issuing the instruction to program the barrel shifter at 608, the length obtained at 601 is broken into valid lower-level lengths at 605. At 606, multiple low-level instructions are issued using the address generated at 607. For example, if the address generated at 607 is A', then the multiple commands may be determined as A' plus a constant, k, times a length, such as a quadword, for alignment. The constant, k, may be an integer multiple of data lengths going into the length obtained at 601. Notably, the integer multiple may be arrived at by rounding up.

By using an initial high-level address to generate a data-aligned low-level address(es), an address range of the data to be transferred as identified at 601 may be spanned. The example of quadword alignment has been used; however, lower-level alignments are possible, such as word alignment, byte alignment, or even bit alignment. Instructions of varying granularity may be provided responsive to data length used for alignment. For example, programming the barrel shifter for a quadword alignment may be different than programming the barrel shifter for a word or byte alignment. The difference may or may not result in a more optimal solution. Notably, although the examples of quadword, word, byte, and bit alignment have been used, it should be understood that other alignment values may be used, such as multiple bits, multiple bytes, and multiple words.

FIG. 7, namely FIGS. 7-1 and 7-2 collectively, is a pseudo-code listing depicting an exemplary embodiment of a Virtual Socket ("VS") write and read API 700. At 701, variables among other parameters may be defined or otherwise initialized. These variables may in part be for one or more write instructions. One or more of such variables may be for one or more Virtual Sockets ("VSs"). At 703, a number of extra bytes to be sent may be determined. The number of extra bytes to be sent may be used to program an interface, such as interface 205 of FIG. 2, to ignore the "correct" bytes. By "correct" bytes, it is meant the number of bytes to be shifted, if any, for data alignment.

At 704, header information may be prepared. In this particular example, the operations code ("Opcode") is 11 bits, which are stored in the first two bytes of the header. At 705, the count and alignment may be stored in the second two bytes of the header. At 706, the header information may be sent to the APU.

At 707, the starting address may be converted to force it to be an aligned address. Notably, this forced conversion may be unnecessary if a force align configuration bit of the APU is set. At 708, the number of aligned quadwords to be sent may be computed.

At 709, variables and other parameters previously initialized for write instructions at 701 may be reinitialized for read instructions at 709. This may include initializing a VS for a read. At 710, as at 703, the number of extra bytes to be sent may be calculated. Again, this number is used to program interface 205 to select the correct bytes. At 711, header information may be prepared. Again, as at 704, the Opcode is 11 bits, where the first two bytes of the header may be used to store the 11-bit Opcode. At 712, as at 705, the count and alignment may be stored in the second two bytes of the header.

At 713, the header information may be sent to the APU. Again, this is done on the read side of API 700, whereas at 706, the sending of the header was done on the write side of API 700. At 714, the starting address may be forced to be aligned for the read operation. At 715, the number of aligned quadwords to be read may be determined.

The terms "Device" and "Opcode" in API 700 allow addressing of different operations associated with APU 204 of FIG. 2. Notably, for both read and write operations, data is respectively read from or written into memory; such data may be other than what is strictly necessary for the requested read or write. Notably, this extra data may be present a problem when getting data from APU 204 of FIG. 2 and writing such obtained data into cache 202 or other memory, because data in cache 202 or other memory that is outside of an address and associated length thereof of the target data may be overwritten unless buffered for being written back or otherwise preserved.

FIG. 8 is a pseudo-code listing depicting an exemplary embodiment of an API 800, which may be an interface for a delay line and a barrel shifter. In the exemplary implementation of interface 205 of FIG. 2, a write first in, first out ("FIFO") pipeline ("wr_fifo_pipeline") may be used to store the last two words, which in the exemplary implementation is 64 bits, written from APU 204 of FIG. 2. This write FIFO pipeline is the delay line as indicated at 801. Position of information from the delay line is selected based on a write FIFO offset ("wr_fifo_offset") as generally indicated at 802. This write FIFO offset contains the lowest two bits of the byte overhead as indicated in FIG. 7. This offset may be used to program the barrel shifter 402 of FIG. 4. An offset of "00" may be handled differently as indicated at 802, as there is no extra word to send.

Control logic 403 of FIG. 4 includes state machine 404. State machine 404 of FIG. 4 may be configured to count each word of a transfer. Accordingly, control logic 403 may be responsible for generating a start of transfer signal ("start_of_transfer") and an end of transfer signal ("end_of_transfer"), such as to an APU or to another module, as indicated in the state diagram of FIG. 9. Notably, such other module may be instantiated in user logic 206 for coupling to APU 204. Furthermore, such other module may include a hardware accelerator instantiated in user logic 206 of FIG. 4. Thus, a write FIFO ready pipeline ("wr_fifo_rdy_pipeline") signal generated by control logic may be used to indicate valid data. The write FIFO ready pipeline signal may be generated as generally indicated at 803.

Words consisting entirely of what may be considered "don't care" data transferred by a read or write as associated with an instruction as issued by a processor or a high-level command are termed "wasted words". The wasted word count, or wasted words, is associated with a line of memory, such as cache memory, which may include multiple words. In the example of a quadword architecture, there are four words in each line of memory. The wasted word count tracks the number of words in a read or write instruction consisting entirely of such "don't care" data. Wasted words are described below in additional detail with reference to FIG. 9.

As generally indicated starting from 803, a check may be made for a full wasted word, in which case no word or words may pass. If there are less than 4 bytes wasted due to byte alignment, no more wasted bytes may have to be processed. Otherwise, a partially wasted word may be written with a delay of a ready indication. Notably, "wasted_words" may be initialized to the value of byte overhead as indicated in FIG. 7 above. Notably, there may be a corresponding implementation for when no extra word needs to be sent. In that implementation, the start of transfer signal may be generated for a first time when the write FIFO ready pipeline signal equals 0. The end of transfer signal may be generated when a correct number of words have been reached. However, interface 205 of FIG. 2 may continue to transfer the "wasted_words" in the last quadword transfer, until such last quadword transfer is finished.

Figure 9:
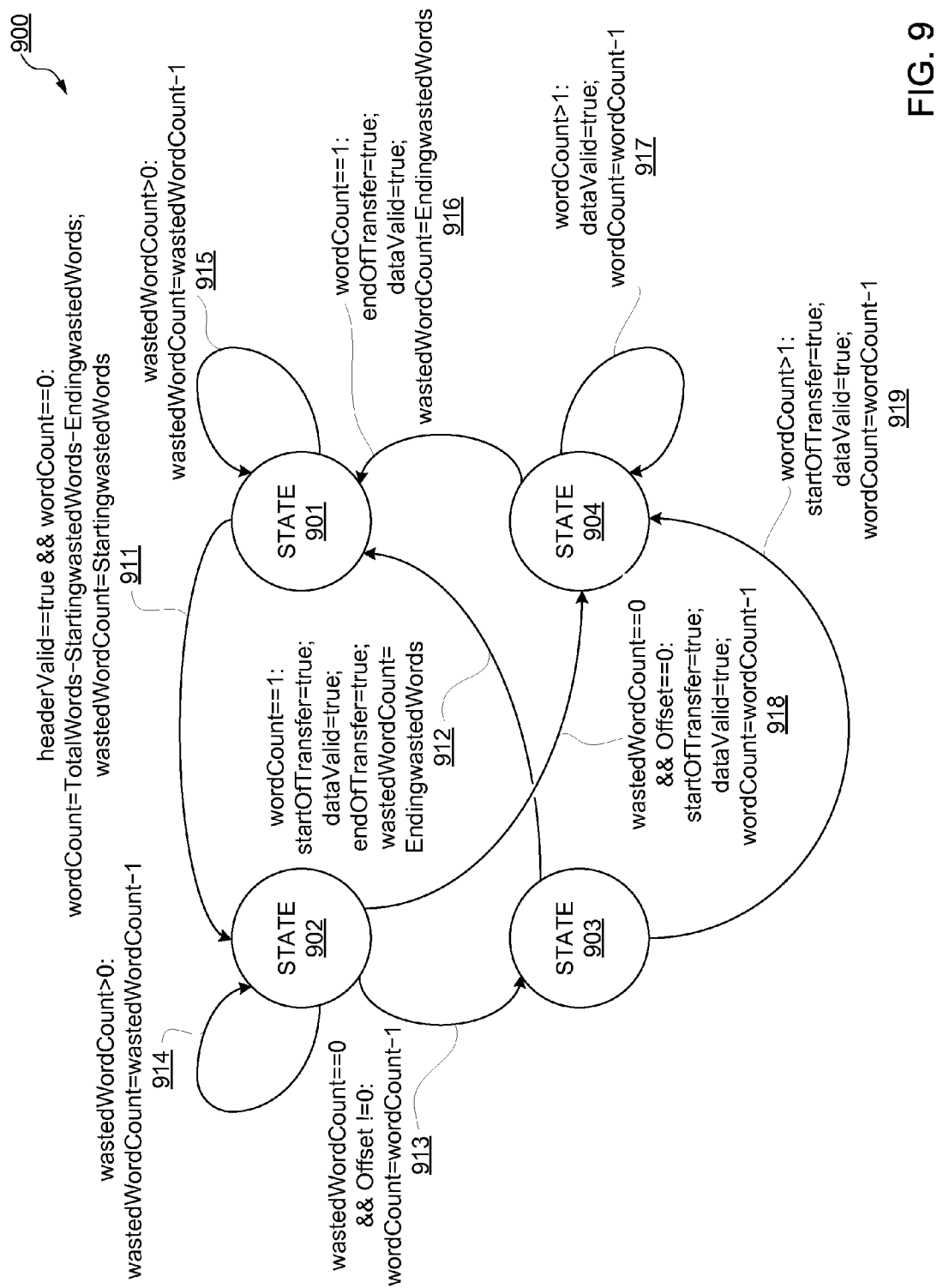
FIG. 9 is a state diagram depicting an exemplary embodiment of a state machine.

FIG. 9 is a state diagram depicting an exemplary embodiment of a state machine 900. State machine 900 may be used for implementing a state machine, such as state machine 404 of FIG. 4.

State machine 900 begins in state 901. State 901 is an "idle state." State machine 900 stays in idle state if wasted word count ("WastedWordCount") is greater than 0 as indicated by condition 915. If the condition that wasted word count is greater than 0 is met, the wasted word count is set equal to the wasted word count minus 1.

Wasted words at the beginning of a line of memory for an instruction are termed starting wasting words ("StartingWastingWords") and words at the end of a line of memory not having valid bytes for an instruction are termed ending wasting words ("EndingWastedWords"). Thus, for example, if an instruction is issued to an APU for a co-processor where the first three words of a quadword are not used, these first three words are wasted words, and more particularly are starting wasted words. Furthermore, if the length of the instruction means that only a first word on a last line of memory accessed has valid bytes, then in the example of the quadword architecture, the last three words in the last line of memory are ending wasted words.

If an instruction is issued from the processor for the APU, then the header valid signal will be set true and the wasted word count may be initially set to 0 as indicated by conditions 911. For these conditions, the word count is set equal to the total number of words minus the starting wasting words minus the ending wasted words. Notably, the total words indicate the total number of words for each line of memory to be accessed, whether or not they have valid bytes. Subtracting out the starting wasted words and the ending wasted words means that the word count is equal to the total number of words having valid bytes. For conditions 911, the wasted word count may be reset to the value of the starting wasted words, which for the example of a quadword architecture, may be either 0, 1, 2, or 3.

If the wasted word count from condition 911 is greater than 0 when in state 902, then the wasted word count is set equal to the wasted word count minus 1. Accordingly, the wasted word count is incremented until the wasted word count is equal to 0, meaning that words not having valid bytes with respect to an instruction are bypassed, one word at a time, until wasted word count is equal to 0, as indicated by condition 914. If wasted word count is equal to 0 when state machine 900 is in state 902, then state machine 900 may transition to either state 904 or state 903. State machine 900 changes state from state 902 to state 904, which is a data transfer state, when condition 918 is met.

Data transfers with no offset follow the path of state 901 to state 902 to state 904. Data transfers with an offset, namely those transfers which require shifting by a barrel shifter as previously described with respect to FIGS. 4, 7, and 8, go through the path of state 901 to state 902 to state 903 to state 904. However, for wasted word count equal to 0 and offset equal to 0, meaning that no bytes in the above example need to be offset for the transfer, the barrel shifter does not need to shift to avoid having invalid bytes be sent as part of an instruction. Accordingly, if conditions 918 are met, state machine 900 transfers from state 902 to state 904, and the start of transfer is set equal to true and data valid is set equal to true. Additionally, the word count is set equal to the word count minus one for incrementally transferring each word part of an instruction.

In state 904, the words for the instruction are transferred. In transfer state 904, state machine 900 may transition back to idle state 901, provided condition 916 is met. Condition 916 is met if word count is equal to 1 then data valid is set equal to true; end of transfer is set equal to true; and wasted word count is set equal to ending wasted words. If, however, when in state 904, condition 917 is met, namely word count is greater than 0, then data valid is set equal to true; and word count is set equal to word count minus one until word count is equal to one. In other words, ending wasted words are not transferred as part of the instruction.

If the length of a transfer is not an integer number of words, meaning that some words contain both valid and invalid bytes, byte activation or enable flags are used to indicate which bytes of the final word contain valid data. If there is a final word which includes invalid bytes, and if conditions 913 are met, state machine 900 transitions from state 902 to state 903. Conditions 913 are wasted word count being equal to 0 and offset being not equal to 0. If these conditions are met, word count is set equal to word count minus 1 and state machine 900 transitions from state 902 to state 903. In state 903, state machine 900 transitions back to idle state 901 if condition 912 is met. Condition 912 is word count being equal to 1. If word count is equal to 1, start of transfer is set equal to true, data valid is set equal to true, and end of transfer is set equal to true. Additionally, wasted word count is set equal to ending wasted words. If, however, word count is greater than one when state machine 900 is in state 903, then state machine 900 transitions from state 903 to transfer state 904. In other words, if condition 919 is met, namely word count is greater than 1, then start of transfer and data valid are both set equal to true and word count is set equal to word count minus 1.

In summary, it should be appreciated that state machine 900 starts in state 901 and finishes in state 901. Additionally, it should be appreciated that any words to be wasted when a valid header is received may be dropped in state 902. If the word count is aligned, namely the offset is equal to 0 such that the barrel shifter does not have to be used, then state machine 900 transitions from state 902 to state 904 where the words for the instruction are transferred. After transferring the valid data, state machine 900 transitions from transfer state 904 back to idle state 901.

If, however, the transfer is not aligned, state machine 900 transitions from state 902 to state 903. State 903 takes care of transferring an extra word and setting the barrel shifter. If there is only a single word to be transferred as part of the instruction, state machine 900 transitions from state 903 back to idle state 901. If, however, there is more than a single word to be transferred as part of the instruction, then state machine 900 transitions from state 903 to transfer state 904, from where the sequence of words may be transferred. After transferring the valid data, state machine 900 transitions from state 904 to idle state 901. It should be appreciated that starting of wasted words as defined above being a non-zero value indicates a misalignment at the beginning of a transfer, and ending of wasted words as defined above being a non-zero value indicates that not all words of a last line of memory have valid data with respect to a transfer.

Figure 10:
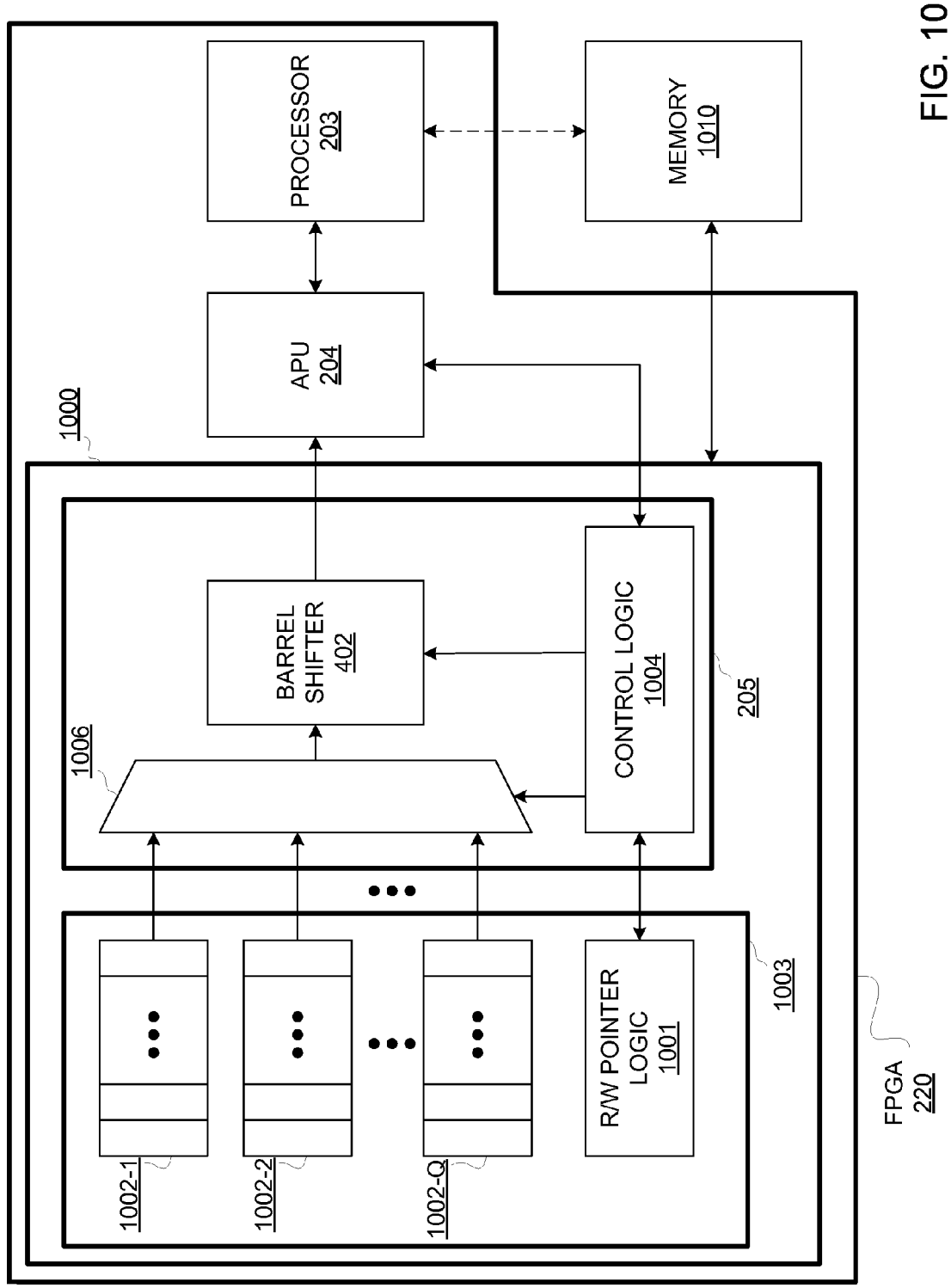
FIG. 10 is a block/schematic diagram depicting an exemplary embodiment of a hardware accelerator instantiated in the FPGA of FIG. 2.

FIG. 10 is a block/schematic diagram depicting an exemplary embodiment of a hardware accelerator 1000 instantiated in FPGA 220 of FIG. 2. FPGA 220 may be coupled to external memory 1010 for communication with hardware accelerator 1000. Optionally, memory 1010 may be coupled with processor 203 of FPGA 220.

As previously described with respect to FIG. 2, APU 204 is coupled to processor 203. Additionally, in this implementation APU 204 is coupled to hardware accelerator 1000. More particularly, APU 204 may be coupled to receive output from barrel shifter 402, and coupled for communication with control logic 1004. Control logic 1004, barrel shifter 402, and multiplexer 1006 are part of interface 205, which may be instantiated in programmable logic 211 of FIG. 2.

To increase throughput, an instruction set processed by processor 203, which generally involves bit-wise manipulation functions, may be offloaded to hardware accelerator 1000. Thus, hardware accelerator 1000 may be configured to do one or more bit manipulations, including reading only a specified number of bits from a multiple-bit word, compiling a bitstream while outputting a variable number of bits, and performing memory table lookups with indices calculated by bit operations, among other known types of bit manipulations.

In the context of video, as well as other media dealing with compressed bitstreams, hardware accelerator 1000 may be implemented as an instruction set pre-processor. In this exemplary implementation, memory 1003, which may include read/write pointer logic 1001 and 1 to Q buffers, such as FIFO buffers 1002-1 through 1002-Q, for Q an integer greater than one, may be coupled to receive 1 to Q bitstreams (not shown).

Memory 1003 may be coupled to interface 205 for coupling to APU 204. In a mode of operation, bitstreams are buffered in buffers 1002-1 through 1002-Q. Processor 203 may request data streamed into memory 1003. Data is provided from hardware accelerator 1000 to processor 203 via APU 204. APU 204 provides a high-speed data link between hardware accelerator 1000 and processor 203. However, alternatively to APU 204, other known high-speed buses or crossbar switches, or like high-speed data interfaces, may be used for coupling hardware accelerator 1000 to processor 203.

Suppose, for example, N' bits of an N-bit word are to be retrieved from memory 1003. Hardware accelerator 1000 retrieves the target word from memory 1010, which optionally may be external memory 1010. Additionally, external memory 1010 may optionally be directly coupled to processor 203 for direct memory access. The word or words retrieved from memory 1010 are buffered in memory 1003 in one or more buffers 1002-1 through 1002-Q. Read/write pointer logic 1001 is used for writing such retrieved data to buffers 1002-1 through 1002-Q. Additionally, read/write pointer logic 1001, under control of control logic 1004, points to which bits are to be read out from one or more buffers 1002-1 through 1002-Q. The bits read out are provided as input to multiplexer 1006. Output of multiplexer 1006, which is under control of control logic 1004, is provided to barrel shifter 402. Barrel shifter 402, which is also under control of control logic 1004, provides barrel shifting for output of such bits to APU 204.

For reading from a compressed bitstream, hardware accelerator 1000 may keep track of a bit pointer, namely the current location in a stream, and update this pointer after every read. Processor 203 need not keep track of such a bit pointer during run time between such reads and rather may merely make a request to hardware accelerator 1000 for transferring N' bits.

Accordingly, data provided to interface 205 from memory 1003 may be provided as an N-bit word with N' valid bits shifted for data alignment. While this alignment was described above with respect to byte-wise and word-wise alignment, it should be appreciated that the above description is equally equivalent to bit-wise alignment. Thus, for example, a number of wasted bits at the front of a word and a number of wasted bits at the end of a word may be identified. Thus, barrel shifter 402 may be used for shifting to where such wasted bits end, namely to where one or more valid bits begin, and control logic 1004 may indicate that such bits are valid. Furthermore, once all valid bits of a word have been output from barrel shifter 402 to APU 204, if there are additional invalid bits, control logic 1004 may be used to zero-pad such other bits. Processor 203, programmed to identify that only the first number of one or more bits are valid, may be used to zero-pad one or more invalid bits. Notably, the above order may be reversed for having processor 203 write back bits to memory 1010, where memory 1003 may be used to buffer such data until all N' bits of a word are ready to be written to memory 1010.

Accordingly, it should be appreciated that processor 203 need not directly access memory 1010 to obtain bits from memory 1010, but rather may use hardware accelerator 1000. Thus, many bit-wise manipulations which were previously handled by processor 203 may be handled by hardware accelerator 1000. Thus, for example, suppose the application is a video conference with streaming video, where each of buffers 1002-1 through 1002-Q receives a separate data stream. It is possible that billions of bit operations may be handled by hardware accelerator 1000. One example may be for hardware accelerator 1000 to act as a bitstream parser of the incoming video bitstreams, such as for MPEG-4, H.264, or other known media protocol. Thus, hardware accelerator 1000 may parse bitstreams, looking for particular markers, such as headers or codes, among other known types of markers. As a parser, hardware accelerator 1000 may be used for reading and showing bits from various video bitstreams, switching between different streams depending on what bits are to be read and used, such as for a multimedia presentation for example.

Use of hardware accelerator 1000 may facilitate enhanced processing rates in accordance with streaming video applications using High-Definition Television ("HDTV") types of bit rates. Notably, for an N-bit bus as between APU 204 and processor 203, processor 203 may be effectively shielded from direct delivery of bitstream data as it may only have to deal with bit-based values provided via hardware accelerator 1000 due to pre-processing by hardware accelerator 1000. To further facilitate this, it may be useful to bit shift via barrel shifter 402 all such data until the target data is the Least Significant Bits ("LSBs") of a word provided on an N-bit bus to processor 203. However, such bits may be anywhere on such bus, and thus need not be the LSBs, depending on the particular protocol being implemented. Notably, it should be appreciated that the data being received by hardware accelerator 1000 may not be byte-aligned, and thus the ability to extract particular bits on request by processor 203 via hardware accelerator 1000 facilitates improved performance. Accordingly, because of this shielding of processor 203 from bit manipulations, processor 203 may simply provide an identification of the bits to be obtained, and possibly the stream number if more than one stream is involved in order to obtain the identified bits.

Figure 11:
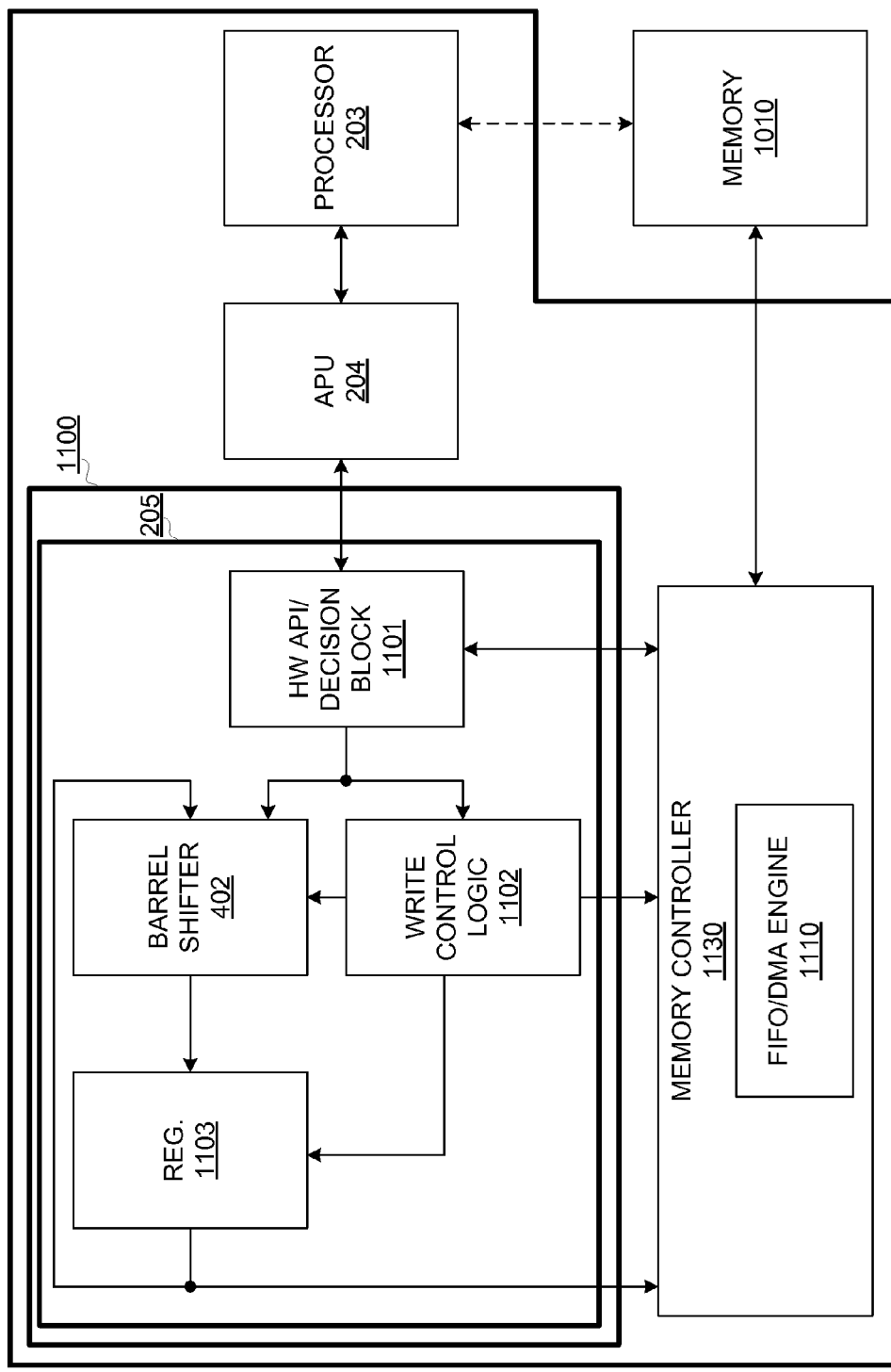
FIG. 11 is a block diagram depicting an exemplary embodiment of another hardware accelerator instantiated in the FPGA of FIG. 2.

FIG. 11 is block diagram depicting an exemplary embodiment of a hardware accelerator 1100 implemented in programmable logic of FPGA 220. Bits may be written by using write control logic 1102, namely write pointer logic, to point to a starting address of vacant bits, and then writing bit values taken from outside of processor 203 and written to the vacant positions. If only one bit of course is involved, then only one vacant position may be involved. Thus, whenever a word is complete, namely all vacant bits have been written into such word, the complete word may be written to external memory 1010.

Continuing the above example of N' bits written to an N-bit word, register 1103 of interface 205 may be an N-bit register. Accordingly, N' bits are written to the N-bit register until an entire N-bit word is stored in register 1103, although location in register 1103 may be updated after each write by write control logic 1102. After N bits, including the N' updated bits, are received, the N-bit word may then be written into memory 1010 via memory controller 1130.

Additional buffering may be implemented in hardware accelerator 1100 for accommodating memory bursting and enhancing memory bandwidth. For example, a combination of a buffer, such as a FIFO buffer, and a direct memory address ("DMA") engine ("FIFO/DMA engine") 1110 may be included as part of memory controller 1130. Processor 203 may be in data communication with hardware accelerator 1100 via APU 204. The order of the data may be preserved by hardware accelerator 1100, but memory 1010 may not have an architecture which allows the variable length data to be stored and the variable lengths provided. For example, memory 1010 may have a 32-bit length for each line of data stored therein. Accordingly, hardware API/decision block 1101 may be used to control write control logic 1102 and to program barrel shifter 402. Additionally, hardware API/decision block 1101 may communicate with memory controller 1130.

Thus, variable length data may be provided to barrel shifter 402. Barrel shifter 402 may shift such data for storing in register 1103 until a full word is stored therein. Additionally, output of register 1103 may be fed back to barrel shifter 402. This feedback may be used to ensure that an update of register 1103 contains a combination of previously stored data from register 1103 as well as the new N' bits received from interface 205. Write control logic 1102 may be used to program barrel shifter 402 for this shifting responsive to a data valid signal from hardware API/decision block 1101. Write control logic 1102 may provide a write pointer to memory controller 1130 and hardware API/decision block 1101 may provide a data valid signal to memory controller 1130. Thus, data written out of register 1103 to memory controller 1130 may be written as an entire word to memory 1010. Thus, the order of data provided by processor 203 to hardware accelerator 1100 may be preserved, even though such data is concatenated when written to memory 1010 to conform to the architecture thereof. Even though a write to memory 1010 was described, it should be appreciated that the reverse direction of a read, such as a read of N' bits of an N-bit word stored in memory 1010, may be done by reversing the above-described direction of data flow.

Figure 12:
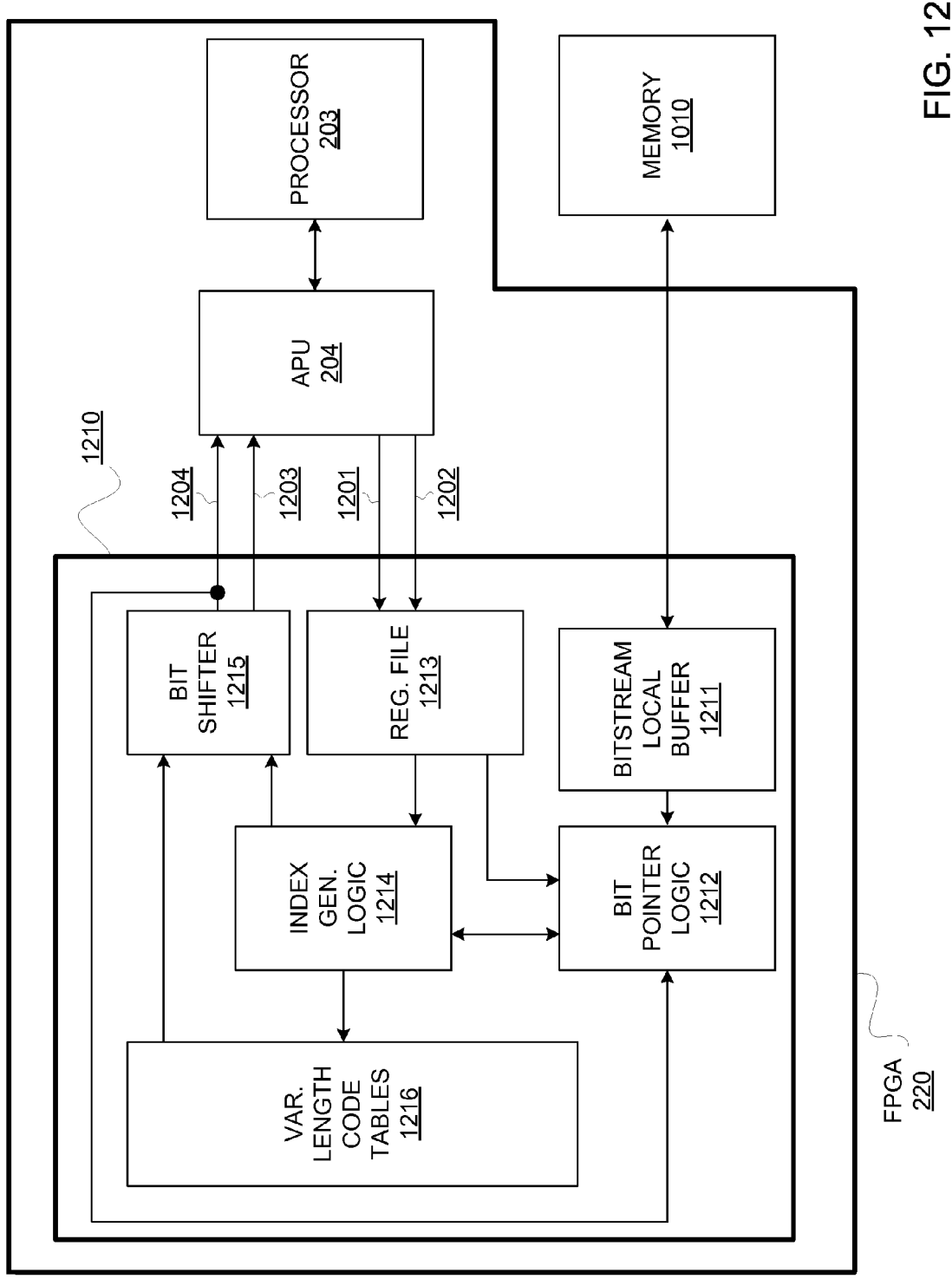
FIG. 12 is a block diagram depicting an exemplary embodiment of a variable length coder, which may be instantiated partially or completely in programmable logic of the FPGA of FIG. 2.

FIG. 12 is a block diagram depicting an exemplary embodiment of a variable length coder 1210, which may be instantiated partially or completely in programmable logic of FPGA 220. Coder 1210 may be a video coder configured for encoding or decoding. For purposes of clarity, only the decoding path is described herein, as the path for variable length encoding path for storing in memory will be readily apparent to those of ordinary skill in the art from the description of the decoding as well as the above description of FIG. 11.

Coder 1210 includes variable length code tables 1216, index generation logic 1214, bit pointer logic 1212, bit shifter 1215, register file 1213, and bitstream local buffer 1211. It should be appreciated that index generation logic 1214 and bit pointer logic 1212 may be part of control logic 403 of an interface 205 as previously described with reference to FIG. 2. It should further be appreciated that bitstream local buffer 1211, register file 1213, and variable length code tables 1216 may be associated with storage means such as registers, buffers, and memory, among other known types of storage accessible by control logic, such as control logic 403 of FIG. 4. Memory for variable length code tables 1216 may or may not be part of interface 205 of FIG. 4 for example. Lastly, bit shifter 1215 may be a barrel shifter, such as barrel shifter 402 of FIG. 4. Thus, it should be appreciated that coder 1210 is an example of an application of interface 205.

As variable length decoding is well known, it is not described in unnecessary detail herein for purposes of clarity. However, it should be appreciated that the number of bits in a frame/block type may be stored in register file 1213 as received from APU 204. The number of bits may be provided via signaling 1201, and the frame/block type may be provided via signaling 1202. This information may be part of a header as previously described with respect to an instruction-type of header the pseudo-code of API 700 of FIG. 7. Optionally, a bitstream word may be stored in register file 1213 as received from APU 204. The number of bits may be provided from register file 1213 to bit pointer logic 1212. The frame/block type may be provided from register file 1213 to index generation logic 1214. Index generation logic 1214 may be used to provide an index to variable length code tables 1216. Additionally, index generation logic 1214 may be coupled for communication with bit pointer logic 1212.

A table value obtained from variable length code tables 1216 responsive to the received index from index generation logic 1214 is provided to bit shifter 1215 along with the length of data associated with the table value. Subject to the control by index generation logic 1214 to program bit shifter 1215 for data alignment, the value received by bit shifter 1215 is shifted out via signaling path 1203 to APU 204. Also shifted out from bit shifter 1215 to APU 204 is the length of the data associated with the value, which may be provided via signaling path 1204. The length shifted out from bit shifter 1215 may further be provided to bit pointer logic 1212. Bitstream information may be stored in memory 1010 and provided to bitstream local buffer 1211. Such bitstream information stored in bitstream local buffer 1211 may be provided to bit pointer logic 1212.

Accordingly, it should be appreciated that read and write operations to external memory 1010 may be done where the size of the data stored, namely the size of the words, such as single words, double words, or increments larger than double words, may be masked by manipulating bit pointers.

Thus, the header provided from APU 204 to coder block 1210 is of an instruction type that coder block 1210 may process. Memory 1010 via bitstream local buffer 1211 provides bitstream information to bit pointer logic 1212. Bit pointer logic 1212 manipulates bitstream information received, and tracks pointers associated therewith. Accordingly, read and write operations from and to memory 1010 are masked with respect to the architecture of memory 1010. In other words, the size of data stored in lengths in memory 1010 is masked, whether such size is a single word, double word, quadword, or some other word length.

Thus, it should be appreciated that interface 205 is in effect a hardware adaptor for adapting communication, for example with processor 203, from an application, which may be a co-processor, a video processor, memory, a user-instantiated design, or other application implementing a high-speed interface, such as APU 204 or other known high-speed data link.

Referring back to FIG. 2, memory 216 or memory 210 may be used for storing a software adaptor. Software adaptor 250 may include instructions for processor 203 for configuring interface 205 via APU 204. Notably, memory 216 may be coupled to cache 202 via processor 203 or more directly coupled to cache 202 for caching instructions. Software adaptor 250 may include an API, such as the APIs of FIGS. 7 and 8 for example, for allowing the user to program building blocks of configuration information 215 for communication with interface 205. Software adaptor 250 may be used to adapt to user code running on processor 203 to program a hardware adaptor, namely interface 205, and thus to provide a user interface of user logic 206 that avoids alignment issues, such as byte alignment issues for example.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A hardware interface in an integrated circuit, comprising:
    data storage coupled to store and provide data;
    a data shifter coupled to the data storage to at least bit shift the data obtained from the data storage; and
    a control circuit coupled to the data storage and the data shifter for controlling a transfer of the data from the data storage and the data shifter;

wherein the control circuit comprises a state machine for controlling operation of the data storage and the data shifter;

wherein the state machine is programmable responsive to code executable by a processor coupled to an auxiliary processing unit to adapt to the auxiliary processing unit; and wherein the control circuit is configured to align the data for communication with a memory via the auxiliary processing unit.

2. The hardware interface according to claim 1, wherein the control circuit is configured to provide a hardware accelerator for tasks offloaded from the processor.

3. The hardware interface according to claim 2, wherein the tasks are associated with data streaming.

4. The hardware interface according to claim 3, wherein the tasks are for transferring a subset of bits with respect to a bit width of the auxiliary processing unit.

5. The hardware interface according to claim 3, wherein the tasks are for transferring the data via the auxiliary processing unit masked from the processor for using bit-based values in instructions from the processor.

6. The hardware interface according to claim 1, wherein the data storage is a plurality of registers, the memory is cache memory coupled to the processor, and the control circuit is instantiated in programmable logic.

7. The hardware interface according to claim 6, wherein the integrated circuit is a programmable logic device.

8. A hardware interface in an integrated circuit, comprising:
   a register having a plurality of register banks coupled to store data;
   a data shifter coupled to receive data from the register and from an auxiliary processing unit; and
   a control circuit coupled to the register and the data shifter for controlling the transfer of the data from the register and the data shifter, the control circuit having a state machine for controlling operation of the register and the data shifter;
   wherein the state machine is programmable by a processor coupled to the auxiliary processing unit to enable a transfer of data with the auxiliary processing unit; and
   wherein the control circuit is configured to provide a hardware accelerator.

9. The hardware interface according to claim 8, wherein control circuit enables transferring data via the auxiliary processing unit masked from the processor for using bit-based values in instructions from the processor.

10. The hardware interface according to claim 8, wherein the data shifter comprises a barrel shifter.

11. The hardware interface according to claim 10, wherein the barrel shifter is coupled to receive a first plurality of bits from the auxiliary processing unit and a second plurality of bits from the plurality of register banks.

12. The hardware interface according to claim 8, wherein the control circuit is configured to align data for communication with a memory via the auxiliary processing unit.

13. An integrated circuit having a hardware interface, comprising:
   a processor;
   an auxiliary processing unit coupled to the processor;
   a hardware interface coupled to the auxiliary processing unit, the hardware interface comprising:
      a register coupled to store data;
      a data shifter coupled to receive data from the register and from the auxiliary processing unit; and
      a control circuit coupled to the register and the data shifter for controlling the transfer of the data from the register and the data shifter, the control circuit having a state machine for controlling operation of the register and the data shifter;
   wherein the state machine is programmable by a processor coupled to the auxiliary processing unit to enable a transfer of data with the auxiliary processing unit; and
   wherein the control circuit is configured to provide a hardware accelerator for tasks offloaded from the processor.

14. The hardware interface according to claim 13, wherein the data shifter comprises a barrel shifter.

15. The hardware interface according to claim 14, wherein the data register comprises a plurality of registers, and the barrel shifter is coupled to receive a plurality of bits from the register and a plurality of bits from the auxiliary processing unit.

16. The hardware interface according to claim 13, wherein the control circuit enables transferring data via the auxiliary processing unit masked from the processor for using bit-based values in instructions from the processor.

17. The hardware interface according to claim 13, wherein the control circuit is configured to align data for communication with a memory via the auxiliary processing unit.

* * * * *